United States Patent
Imaizumi et al.

(10) Patent No.: US 10,511,020 B2
(45) Date of Patent: Dec. 17, 2019

(54) NICKEL COMPOSITE HYDROXIDE PARTICLE AND PROCESS FOR PRODUCING THE SAME, POSITIVE ELECTRODE ACTIVE MATERIAL FOR NON-AQUEOUS ELECTROLYTE SECONDARY BATTERY AND PROCESS FOR PRODUCING THE SAME, AND NON-AQUEOUS ELECTROLYTE SECONDARY BATTERY

(71) Applicants: SUMITOMO METAL MINING CO., LTD., Tokyo (JP); SANYO Electric Co., Ltd., Moriguchi-shi (JP)

(72) Inventors: Shin Imaizumi, Niihama (JP); Hideo Sasaoka, Niihama (JP); Shinichi Yasuda, Niihama (JP); Yutaka Kawatate, Kadoma (JP); Takahiro Sakamoto, Kadoma (JP)

(73) Assignees: SUMITOMO METAL MINING CO., LTD., Tokyo (JP); SANYO ELECTRIC CO., LTD., Moriguchi-shi (JP)

( * ) Notice: Subject to any disclaimer, the term of this patent is extended or adjusted under 35 U.S.C. 154(b) by 188 days.

(21) Appl. No.: 14/439,058

(22) PCT Filed: Oct. 15, 2013

(86) PCT No.: PCT/JP2013/077965
§ 371 (c)(1),
(2) Date: Apr. 28, 2015

(87) PCT Pub. No.: WO2014/115380
PCT Pub. Date: Jul. 31, 2014

(65) Prior Publication Data
US 2015/0372300 A1  Dec. 24, 2015

(30) Foreign Application Priority Data

Jan. 28, 2013 (JP) .................................. 2013-013021

(51) Int. Cl.
*H01M 4/525* (2010.01)
*C01G 53/00* (2006.01)
*H01M 10/0525* (2010.01)

(52) U.S. Cl.
CPC ............ *H01M 4/525* (2013.01); *C01G 53/42* (2013.01); *C01P 2002/52* (2013.01);
(Continued)

(58) Field of Classification Search
CPC ............ H01M 4/525; H01M 10/0525; H01M 2220/30; C01G 53/42; C01P 2002/52;
(Continued)

(56) References Cited

U.S. PATENT DOCUMENTS

2004/0265216 A1* 12/2004 Nazri ............... C01G 53/42
423/594.4
2007/0231691 A1* 10/2007 Abe ................. C01G 53/00
429/223

(Continued)

FOREIGN PATENT DOCUMENTS

WO    WO2011089958    *  7/2011

*Primary Examiner* — Peter F Godenschwager
*Assistant Examiner* — Andrew J. Oyer
(74) *Attorney, Agent, or Firm* — Kratz, Quintos & Hanson, LLP

(57) ABSTRACT

An objective of the present invention is to provide a non-aqueous electrolyte secondary battery positive electrode active material formed from a lithium-nickel composite oxide which, while retaining high capacity and a high level of safety, has an excellent cycle characteristic by controlling reaction resistance and a method for producing it. [Solution] A lithium-nickel composite oxide is produced by steps (a) to (c) described below: (a) nickel hydroxide and/or nickel oxyhydroxide in a prescribed composition are sintered in a non-reducing atmosphere having 850° C. or lower to give nickel oxide; (b) after the nickel oxide and a lithium com- (Continued)

pound are mixed in a prescribed molar ratio, the mixture is sintered in an oxygen atmosphere at a temperature of 650 to 850° C.; and (c) after an obtained powder is made to be in a prescribed slurry concentration, it is washed with water during a period of time which satisfies the following formula:

$$B/40 < A \leq B/10$$

wherein A is a time for washing with water presented as a unit of a minute, B is a slurry concentration of the obtained powder presented as a unit of g/L, filtered and dried.

6 Claims, 2 Drawing Sheets

(52) U.S. Cl.
CPC ...... *C01P 2002/54* (2013.01); *C01P 2002/88* (2013.01); *C01P 2006/12* (2013.01); *C01P 2006/40* (2013.01); *H01M 10/0525* (2013.01); *H01M 2220/30* (2013.01)

(58) Field of Classification Search
CPC .............. C01P 2002/54; C01P 2006/12; C01P 2006/40; C01P 2002/88
See application file for complete search history.

(56) References Cited

U.S. PATENT DOCUMENTS

| | | | |
|---|---|---|---|
| 2007/0231694 A1* | 10/2007 | Abe | H01M 4/485 429/231.1 |
| 2012/0119167 A1* | 5/2012 | Matsumoto | C01G 53/42 252/519.15 |
| 2012/0292561 A1* | 11/2012 | Sasaoka | C01G 53/04 252/182.1 |

* cited by examiner

[FIG.1]
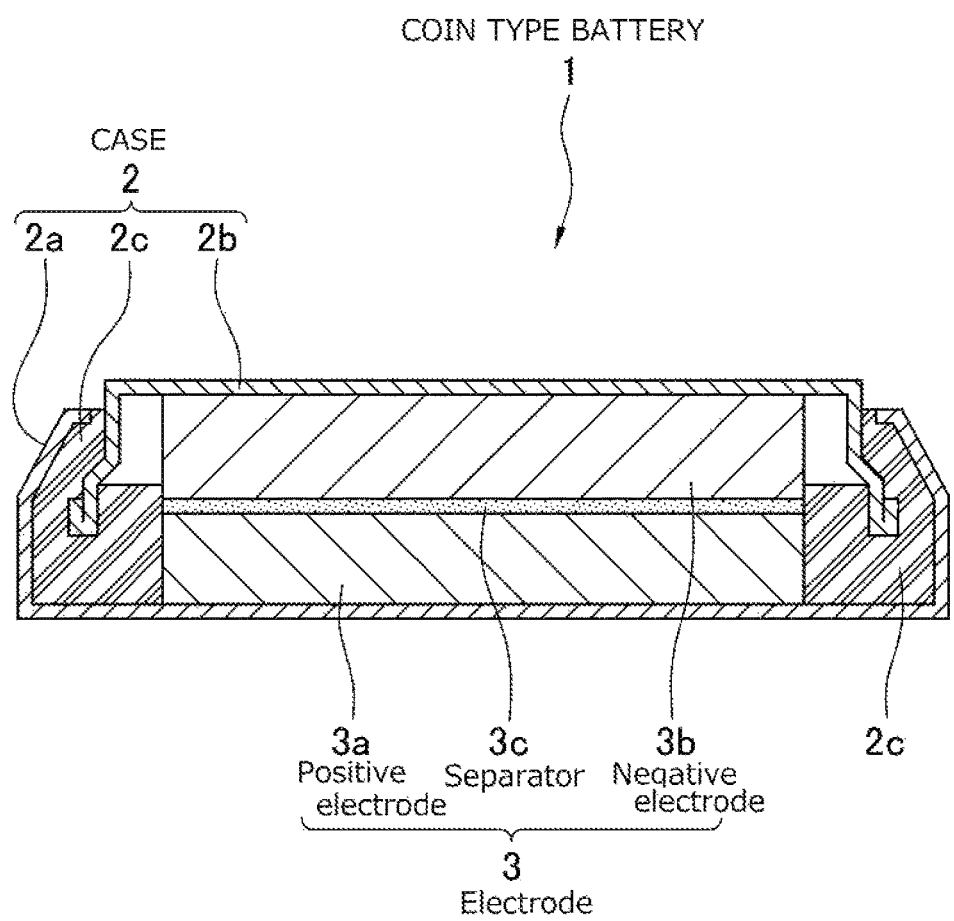

[FIG.2]
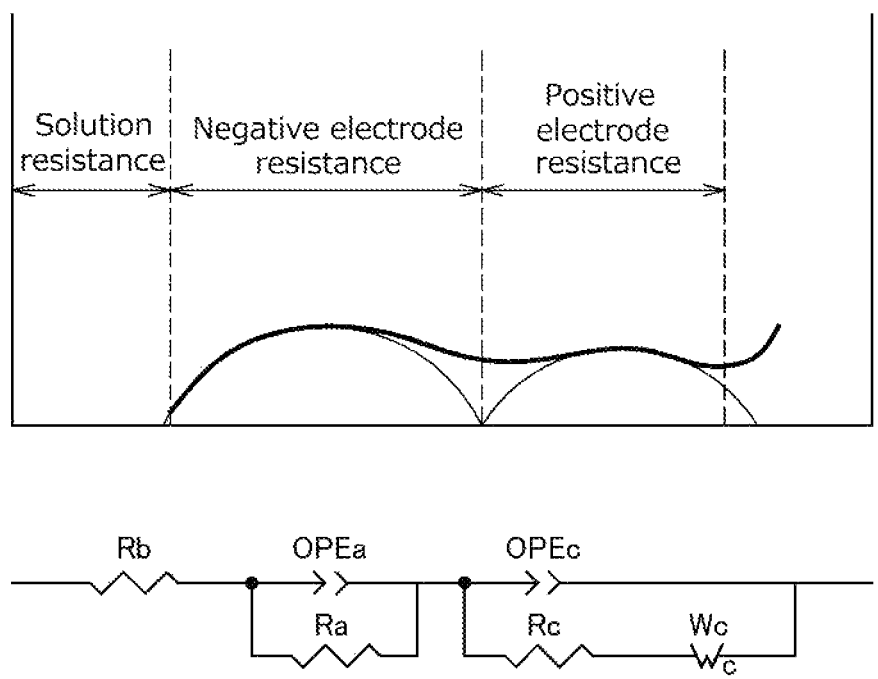

NICKEL COMPOSITE HYDROXIDE PARTICLE AND PROCESS FOR PRODUCING THE SAME, POSITIVE ELECTRODE ACTIVE MATERIAL FOR NON-AQUEOUS ELECTROLYTE SECONDARY BATTERY AND PROCESS FOR PRODUCING THE SAME, AND NON-AQUEOUS ELECTROLYTE SECONDARY BATTERY

TECHNICAL FIELD

The present invention relates to a positive electrode active material for a non-aqueous electrolyte secondary battery and a process for producing the same, and a non-aqueous electrolyte secondary battery in which the positive electrode active material is used. More specifically, the present invention relates to a positive electrode active material for a non-aqueous electrolyte secondary battery made of lithium-nickel composite oxide which has a high capacity, and is inexpensive and excellent in thermal stability and cycle characteristic, and a process for producing the positive electrode active material, which is suitable for industrially producing the positive electrode active material, and a non-aqueous electrolyte secondary battery having a high capacity and a high level of safety, in which the positive electrode active material is used.

BACKGROUND ART

In recent years, with the rapid spread of small electronic equipment such as a mobile phone and a notebook-sized personal computer, demand for a non-aqueous electrolyte secondary battery which is used as a chargeable and dischargeable power supply has been rapidly increased. As a positive electrode active material for a non-aqueous electrolyte secondary battery, lithium-nickel composite oxide represented by lithium-nickel dioxide ($LiNiO_2$) and lithium-manganese composite oxide represented by lithium-manganese dioxide ($LiMnO_2$) have been wildly used as well as lithium-cobalt composite oxide represented by lithium-cobalt dioxide ($LiCoO_2$).

However, there are some defects in the lithium cobalt dioxide, such that the lithium cobalt dioxide is expensive because its reserve is a little in the earth, and that the lithium cobalt dioxide contains cobalt which is unstable in supply and has a highly fluctuating price range, as a major component. Therefore, there have been remarked lithium-nickel composite oxide containing relatively inexpensive nickel as a major component and lithium-manganese composite oxide containing relatively inexpensive manganese as a major component from the viewpoint of cost. The lithium manganese dioxide is superior in thermal stability to lithium manganese dioxide. However, the lithium manganese dioxide has some problems when the lithium manganese dioxide is practically used in a battery, because its charge and discharge capacity is much smaller than that of the other materials, and its charge and discharge cycle characteristic showing the life of a battery is much shorter than that of the other materials. On the other hand, since the lithium nickel dioxide has a charge and discharge capacity greater than the lithium cobalt dioxide, the lithium nickel dioxide has been expected to be used as a positive electrode active material which enables to produce an inexpensive battery having a high energy density.

The lithium nickel oxide is usually produced by mixing a lithium compound with a nickel compound such as nickel hydroxide or nickel oxyhydroxide, and calcining them. The form of the lithium nickel oxide is powder in which primary particles are mono-dispersed or powder of secondary particles of aggregated primary particles having spaces between the primary particles. However, both powders have some defects such that the powders are inferior in thermal stability under the state of charge to the cobalt lithium dioxide. Specifically, since pure lithium nickel dioxide has a defect in thermal stability, and charge and discharge cycle characteristic, the lithium nickel dioxide cannot be used in a practical battery. This is because the stability of the lithium nickel dioxide in crystal structure under the state of charge is inferior to that of the lithium cobalt dioxide.

In order to eliminate this defect, it has been commonly carried out that a part of nickel is replaced with a transition metal element such as cobalt, manganese or iron, or an element which is different from nickel, such as aluminum, vanadium or tin, to stabilize the crystal structure in the state such that lithium is fell out by charging, to give lithium-nickel composite oxide having suitable thermal stability and charge and discharge cycle characteristic, which can be used as a positive electrode active material (see, for example, Non-patent Literature 1 and Patent Literature 1).

However, the replacement of the nickel with an element in a small amount causes insufficient improvement in thermal stability, and the replacement of the nickel with an element in a large amount causes lowering in electric capacity. Therefore, the advantageous merits of the lithium-nickel composite oxide cannot be sufficiently imparted to a battery.

Also, in order to reduce the reactivity of a positive electrode active material and an electrolyte in a battery, there has been proposed a method which includes reducing the specific surface area of a positive electrode active material which is used for the purpose of reducing its reaction area, to improve thermal stability (see, for example, Patent Literature 2). This method has been found on the basis such that thermal stability is improved by introducing aluminum and yttrium in a small amount into lithium composite oxide, and that the reactivity of an anode material and an electrolyte under overcharge can be suppressed by reducing the specific surface area of the lithium composite oxide.

However, since the above-mentioned method is focused on the specific surface area in terms of the reaction area between the positive electrode active material and the electrolyte under the condition where impurities or by-products are attached to the surface of the particles of the positive electrode active material, the specific surface area used in the above-mentioned method does not reveal an exact reaction area.

As a method for reforming a positive electrode active material, Patent Literature 3 proposes a method for removing impurities or by-products which are attached to the positive electrode active material by washing with water under a specific condition. Patent Literature 3 refers to the effect for improving thermal stability by the change of the specific surface area of the powder after washing with water, and DSC calorific value.

PRIOR ART LITERATURES

Patent Literatures

Patent Literature 1: Japanese Patent No. 3244314
Patent Literature 2: Japanese Unexamined Patent Publication No. HEI 11-135123

Patent Literature 3: Japanese Unexamined Patent Publication No. 2007-273108

Non-Patent Literature

Non-Patent Literature 1: "High density lithium rechargeable battery", TECHNO SYSTEM CO., LTD, Mar. 14, 1998, p. 61-78

SUMMARY OF THE INVENTION

Technical Problem to be Solved by the Invention

One of important battery characteristics is cycle characteristic. This cycle characteristic is one of representative characteristics in the field of rechargeable batteries. Generally, it has been known that the control of the reaction resistance of the positive electrode active material is important for improving the cycle characteristic. When the reaction resistance is too low, since deterioration of the active material is accelerated, wrong influences will be imparted to the cycle characteristic. To the contrary, when the reaction resistance is too high, the fundamental use of a battery is limited, because electric density cannot be increased, and exothermic is accelerated.

However, in Patent Literature 3, a method for removing impurities or by-products which are attached to a positive electrode active material by washing with water under predetermined conditions has not been examined from the viewpoint of cycle characteristic which is important as a battery characteristic.

In view of the aforementioned circumstances, the present invention has been accomplished, and an object of the present invention is to provide a positive electrode active material for a non-aqueous electrolyte secondary battery which includes lithium-nickel composite oxide which maintains a high capacity and a high level of safety, and moreover is excellent in reaction resistance of a positive electrode and cycle characteristic, and a process for producing the same.

In addition, an object of the present invention is to provide a positive electrode active material for a non-aqueous electrolyte secondary battery, which is produced from the above-mentioned lithium-nickel composite oxide, and a process for producing the same.

Furthermore, an object of the present invention is to provide a non-aqueous electrolyte secondary battery which contains the above-mentioned positive electrode active material for a non-aqueous electrolyte secondary battery.

Means for Solving the Problems

A process for producing a positive electrode active material for a non-aqueous electrolyte secondary battery according to the first aspect of the present invention is characterized in that the process includes following processes (a) to (c):
(a) a process for calcining nickel hydroxide and/or nickel oxyhydroxide, which contains nickel as a major component and at least one element selected from the group consisting of transition metal elements other than nickel, group II elements and group XIII elements as a subsidiary component in a non-reducing atmosphere having a temperature of 850° C. or lower, to prepare a nickel oxide;
(b) a process for preparing a calcined powder represented by the following formula (1):

$$Li_aNi_{1-b}M_bO_2 \qquad (1)$$

wherein M is at least one element selected from the group consisting of transition metal elements other than Ni, group II elements and group XIII elements, and a satisfies 1.00≤a≤1.10, and b satisfies 0.01≤b≤0.5,
which includes mixing the above-mentioned nickel oxide with a lithium compound so that the molar ratio of lithium included in the lithium compound to the total moles of nickel, transition metal elements other than nickel contained in the nickel oxide, group II elements and group XIII elements is 1.00 to 1.10, and thereafter calcining the resulting mixture in an oxygen-containing atmosphere at a temperature of 650 to 850° C.; and
(c) a process for preparing powder of lithium-nickel composite oxide, which includes preparing slurry containing the above-mentioned calcined powder in a concentration of 500 to 2000 g/L, washing the calcined powder with water in the form of slurry for a period of time which satisfies the following formula (2):

$$B/40 < A \leq B/10 \qquad (2)$$

wherein A is a period of time for washing with water, of which unit is represented by minute, and B is a concentration of a slurry, of which unit is represented by of g/L, and thereafter filtering and drying the slurry.

A process for producing a positive electrode active material for a non-aqueous electrolyte secondary battery of the second aspect of the present invention is characterized in that the electric conductivity of liquid part of the above-mentioned slurry is controlled to 30 to 60 mS/cm in the first aspect of the present invention.

A process for producing a positive electrode active material of the third aspect of the present invention is characterized in that the above-mentioned nickel hydroxide is prepared by adding dropwise an aqueous solution of a metal compound containing nickel as a major component and at least one element selected from the group consisting of transition metals other than nickel, group II elements and group XIII elements as a subsidiary component, and an aqueous solution containing a compound for supplying ammonium ion to a reaction vessel being heated, and adding dropwise an aqueous solution of an alkali metal hydroxide to the reaction vessel in an amount which is sufficient for maintaining the resulting reaction solution to alkaline as occasion demands in the first aspect of the present invention.

A process for producing a positive electrode active material of the fourth aspect of the present invention is characterized in that the above-mentioned nickel oxyhydroxide is prepared by adding dropwise an aqueous solution of a metal compound containing nickel as a major component and at least one element selected from the group consisting of transition metals other than nickel, group II elements and group XIII elements as a subsidiary component, and an aqueous solution containing a compound for supplying ammonium ion to a reaction vessel being heated, adding dropwise an aqueous solution of an alkali metal hydroxide to the reaction vessel in an amount which is sufficient for maintaining the resulting reaction solution to alkaline as occasion demands, and subsequently further adding an oxidizing agent to the reaction vessel in the first aspect of the present invention.

A process for producing a positive electrode active material for a non-aqueous electrolyte secondary battery of the fifth aspect of the present invention is characterized in that the above-mentioned lithium compound is at least one member selected from the group consisting of lithium hydroxide, lithium oxyhydroxide, lithium oxide, lithium carbonate, lithium nitrate and lithium halide in the first aspect of the present invention.

A process for producing a positive electrode active material for a non-aqueous electrolyte secondary battery of the sixth aspect of the present invention is characterized in that drying is carried out in an atmosphere not containing a compound including carbon and sulfur or in a reduced-pressure atmosphere in the process (c) of the first aspect of the present invention.

A positive electrode active material for a non-aqueous electrolyte secondary battery of the seventh aspect of the present invention is characterized in that the positive electrode active material is obtained by the process according to any one of the first to sixth aspects of the present inventions.

A non-aqueous electrolyte secondary battery of the eighth aspect of the present invention is characterized in that the positive electrode active material for a non-aqueous electrolyte secondary battery according to the seventh aspect of the present invention is used as a positive electrode active material.

Effects of the Invention

According to the first aspect of the present invention, when the positive electrode active material for a non-aqueous electrolyte secondary battery is used in a non-aqueous electrolyte secondary battery, the secondary battery maintains its high capacity and a high level of safety, and is excellent in cycle characteristic.

According to the second aspect of the present invention, impurities attached to the surface of calcined powder can be appropriately removed.

According to the third aspect of the present invention, since nickel hydroxide powder having a high bulk density is obtained, lithium-nickel composite oxide having a small specific surface area after washing with water can be easily produced by using the nickel hydroxide powder.

According to the fourth aspect of the present invention, since nickel oxyhydroxide powder having a high bulk density is obtained, lithium-nickel composite oxide having a specific surface area after washing with water can be easily produced by using the nickel oxyhydroxide powder.

According to the fifth aspect of the present invention, there can be obtained some advantages such that impurities do not remain in the positive electrode active material after calcining.

According to the sixth aspect of the present invention, since the moisture content in the lithium-nickel composite oxide can be sufficiently reduced, there can be obtained some advantages such that the generation of gas originated from the moisture can be suppressed when the positive electrode active material is used in a non-aqueous electrolyte secondary battery.

According to the seventh aspect of the present invention, when the positive electrode active material is used in a non-aqueous electrolyte secondary battery, the non-aqueous electrolyte secondary battery maintains its high capacity and a high level of safety, and is excellent in cycle characteristic.

According to the eighth aspect of the present invention, since the positive electrode active material according to the seventh aspect of the present invention is used in the non-aqueous electrolyte secondary battery, the non-aqueous electrolyte secondary battery maintains its high capacity and a high level of safety, and its cycle characteristic can be improved.

BRIEF EXPLANATION OF DRAWINGS

FIG. 1 is a schematic cross-sectional drawing of a coin type battery 1 which is used in the evaluation of a battery.

FIG. 2 is a schematic explanatory drawing of an equivalent circuit which is used in a measurement example and the analysis of an impedance evaluation.

MODE FOR CARRYING OUT THE INVENTION

According to the process for producing a positive electrode active material for a non-aqueous electrolyte secondary battery containing lithium-nickel composite oxide of the present invention, there can be produced lithium-nickel composite oxide, which enables to improve battery characteristics of a battery when the positive electrode active material for the non-aqueous electrolyte secondary battery is used, by washing a calcined powder of the lithium-nickel composite oxide with water under predetermined conditions.

In other words, when the lithium-nickel composite oxide which is produced by the process of the present invention is used as a positive electrode active material, there can be produced a secondary battery having high cycle characteristic while maintaining high battery capacity and thermal stability.

Hereinafter, the positive electrode active material for the non-aqueous electrolyte secondary battery and a process for producing the same, and the non-aqueous electrolyte secondary battery, in which the positive electrode active material is used, of the present invention are explained.

(Positive Electrode Active Material for a Non-Aqueous Electrolyte Secondary Battery)

First of all, the positive electrode active material for a non-aqueous electrolyte secondary battery of the present invention is explained below.

The positive electrode active material for a non-aqueous electrolyte secondary battery of the present invention is calcined powder having a formula (1) described below, which is produced by washing powder of lithium-nickel composite oxide with water under predetermined conditions, and drying the powder, to remove accretions such as impurities and by-products, existing on the surface of the powder.

$$Li_aNi_{1-b}M_bO_2 \tag{1}$$

wherein M is at least one element selected from the group consisting of transition metal elements other than Ni, group II elements and group XIII elements, "a" satisfies $1.00 \leq a \leq 1.10$, and "b" satisfies $0.01 \leq b \leq 0.5$.

Conditions for washing with water and drying the powder of the lithium-nickel composite oxide are explained when the process for producing is described later. The powder of lithium-nickel composite oxide after drying has a specific surface area (hereinafter referred to as specific surface area after washing with water) of 1.0 to 2.0 m²/g by washing the powder with water and drying under predetermined conditions.

When the powder of lithium-nickel composite oxide is used as a positive electrode active material for a non-aqueous electrolyte secondary battery, in the case where the specific surface area after washing with water exceeds 2.0 m²/g, its calorific value is remarkably increased by the reaction with an electrolyte, and lowering of thermal stability and excess lowering of the reaction resistance of the positive electrode are caused. On the other hand, when the specific surface area after washing with water is less than 1.0 m²/g, lowering of a battery capacity is apt to be caused, although heat generation is suppressed.

Accordingly, a non-aqueous electrolyte secondary battery, in which the aforementioned powder of lithium-nickel composite oxide, that is, the positive electrode active material for a non-aqueous electrolyte secondary battery of the present invention is used, has a high capacity and a high level of safety, and moreover is excellent in cycle characteristic.

Incidentally, the above-mentioned specific surface area of the powder of lithium-nickel composite oxide is a value when determined by a gas adsorption method (BET method).

(Process for Producing Positive Electrode Active Material for a Non-Aqueous Electrolyte Secondary Battery)

Next, the aforementioned process for producing a positive electrode active material for a non-aqueous electrolyte secondary battery of the present invention (hereinafter referred to as process of the present invention) is described.

The process of the present invention includes the following processes (a) to (c):

(a) a process for calcining nickel hydroxide and/or nickel oxyhydroxide, which contains nickel as a major component and at least one element selected from the group consisting of transition metal elements other than nickel, group II elements and group XIII elements as a subsidiary component in a non-reducing atmosphere having a temperature of 850° C. or lower, to prepare nickel oxide (process for preparing nickel oxide);

(b) a process for mixing the above-mentioned nickel oxide with a lithium compound so that the amount of lithium in the above-mentioned lithium compound to the total amount of nickel in the above-mentioned lithium compound, transition metal elements other than the nickel, group II elements and group XIII elements is 1.00 to 1.10 in a molar ratio, and thereafter calcining the resulting mixture at a temperature of 650 to 850° C. in an oxygen-containing atmosphere, to prepare a calcined powder represented by the following formula (1):

$$Li_aNi_{1-b}M_bO_2 \quad (1)$$

wherein M is at least one element selected from the group consisting of transition metal elements other than Ni, group II elements and group XIII elements, "a" satisfies 1.00≤a≤1.10, and "b" satisfied 0.01≤b≤0.5 (process for preparing calcined powder); and (c) a process for preparing a slurry of the above-mentioned calcined powder having a slurry concentration of 500 to 2000 g/L, washing the calcined powder with water in the form of slurry for a period of time satisfying the formula (2):

$$B/40 < A \leq B/10 \quad (2)$$

wherein "A" is a washing period of time with water, of which unit is represented by minute, and "B" is a slurry concentration of which unit is represented by g/L, and thereafter filtering and drying the slurry, to give a powder of lithium-nickel composite dioxide (process for washing with water).

In the above process, it is preferred that the electric conductivity of the liquid of the slurry is controlled to 30 to 60 mS/cm.

[Process for Preparing Nickel Oxide (a)]

In the process for preparing nickel oxide (a), there is prepared nickel oxide containing nickel as a major component and at least one element selected from the group consisting of transition metal elements other than Ni, group II elements and group XIII as a subsidiary component.

More specifically, the nickel oxide is prepared by calcining nickel hydroxide and/or nickel oxyhydroxide, which contains nickel as a major component and at least one element selected from the group consisting of transition metal elements other than Ni, group II elements and group XIII.

(Nickel Hydroxide)

The nickel hydroxide which is used in the process (a) is not particularly limited. As the nickel hydroxide, there can be used, for example, nickel hydroxide which is prepared by a method such as a crystallization method, a coprecipitation method or a homogeneous precipitation method. When the crystallization method is employed, conditions for preparing nickel hydroxide are not particularly limited, because the nickel hydroxide can be prepared under various conditions.

When the nickel hydroxide prepared by the crystallization method is used as nickel hydroxide used in the process (b), it is preferred to use the nickel hydroxide which is prepared under the following conditions.

More specifically, it is preferred to use the nickel hydroxide which is prepared by adding dropwise an aqueous solution of a metal compound containing nickel as a major component and at least one element selected from the group consisting of transition metals other than nickel, group II elements and group XIII elements as a subsidiary component, and an aqueous solution containing an ammonium ion donor to a reaction vessel which is heated to a temperature of 40 to 60° C., and at that time, adding dropwise an aqueous solution of an alkali metal hydroxide to the reaction vessel in an amount sufficient for maintaining the resulting reaction solution to be alkaline, preferably at a pH value of 10 to 14 as occasion demands. The nickel hydroxide prepared by this method is suitable as a raw material of lithium-nickel composite oxide which is used for preparing a positive electrode active material for a non-aqueous electrolyte secondary battery, because the nickel hydroxide is in the form of powder having a high bulk density, and lithium-nickel composite oxide having a small specific surface area after washing with water can be easily prepared from the nickel hydroxide.

(Nickel Oxyhydroxide)

The nickel hydroxide which is used in the process (a) is also not particularly limited. It is preferred to use nickel hydroxide which is prepared by further adding an oxidizing agent such as sodium hypochlorite or an aqueous solution of hydrogen peroxide to the reaction solution after adding dropwise the aqueous solution of an alkali metal hydroxide to the reaction vessel so as be alkaline. The nickel oxyhydroxide prepared by this method is suitable as a raw material of lithium-nickel composite oxide which is used for preparing a positive electrode active material for a non-aqueous electrolyte secondary battery, because the nickel oxyhydroxide is in the form of powder having a high bulk density, and lithium-nickel composite oxide having a small specific surface area after washing with water can be easily prepared from the nickel oxyhydroxide.

(Conditions for Calcining)

It is preferred that the above-mentioned nickel hydroxide and/or the nickel oxyhydroxide is calcined at a temperature of 850° C. or lower, preferably at a temperature of 500 to 745° C. in a non-reducing atmosphere.

When the nickel hydroxide and/or the nickel oxyhydroxide is calcined at a temperature exceeding 850° C., the reactivity of nickel oxide which is converted from the nickel hydroxide or the nickel oxyhydroxide by the calcination and the lithium compound is lowered, and battery capacity after washing with water is lowered because the eluted amount of lithium is increased when washing with water.

Incidentally, the atmosphere where the nickel hydroxide and/or the nickel oxyhydroxide is calcined can be an atmosphere where the nickel hydroxide and/or the nickel oxyhydroxide is not reduced (non-reducing atmosphere), and the atmosphere can be, for example, the air.

[Process for Preparing Calcined Powder (b)]

The process for preparing a calcined powder (b) includes mixing the nickel oxide obtained in the process (a) with a lithium compound, and thereafter calcining the resulting mixture at a maximum temperature of 650 to 850° C. in an oxygen-containing atmosphere, to prepare a calcined powder having a composition represented by the above-mentioned formula (1).

Incidentally, an apparatus and a process for mixing the nickel oxide with the lithium compound are not particularly limited, and can be those in which the nickel oxide can be homogeneously mixed with the lithium compound. The apparatus includes, for example, a dry-type mixer such as a V blender, a mixing and granulating machine, and the like.

(Lithium Compound)

The lithium compound which is mixed with the nickel oxide is not particularly limited, and it is preferred to use at least one compound selected from the group consisting of lithium hydroxide, lithium oxyhydroxide, lithium oxide, lithium carbonate, lithium nitrate and lithium halide. When the lithium compound is used together with the nickel oxide, there can be obtained some advantages such that impurities do not remain after calcining.

(Molar Ratio of Lithium Compound)

In the process (b), the mixing ratio of the nickel oxide to the lithium compound is not particularly limited. It is preferred that the mixing ratio is controlled, for example, so that the amount of lithium in the lithium compound is 1.00 to 1.10 in a molar ratio to the total amount of nickel in the nickel oxide, transition metal elements other than nickel, group II elements and group XIII elements.

When the molar ratio is less than 1.00, crystallinity of an obtained calcined powder is remarkably lowered, and thereby problems such as large decrease in battery capacity will be caused.

On the other hand, when the molar ratio exceeds 1.10, a surplus of the lithium compound exists in a large amount on the surface of an obtained calcined powder, and it becomes difficult to remove the lithium compound from the surface by washing with water. Therefore, when the obtained calcined powder is used as a positive active material, not only gas is generated in a large amount in the case where a battery is charged, but also there arises a problem such that the slurry is gelled by the reaction with a substance such as an organic solvent and the like which are used in producing an electrode, since the calcined powder has a high pH value.

In addition, according to the process of the present invention, even when washing is carried out with water in a process for washing with water described below, the amount of lithium eluted to water is slight during washing with water. Therefore, when the mixing ratio of the nickel oxide and the lithium compound is controlled to the above-mentioned molar ratio in the process for preparing the calcined powder (b), since the final composition of the positive electrode active material is optimized, a positive electrode active material having excellent battery characteristic can be obtained. More specifically, since the eluted amount of lithium is 0.02 to 0.04 or so in a molar ratio to the metal elements other than lithium in the lithium-nickel composite oxide, when the mixing ratio is controlled to the above molar ratio, the molar ratio of lithium in the positive electrode active material which is a final product (lithium ratio) becomes 0.97 to 1.08. Since this molar ratio makes the composition of the positive electrode active material optimal, a positive electrode active material having excellent battery characteristic can be obtained.

(Calcination)

An equipment and a process for calcining a mixture prepared by mixing the nickel oxide with the lithium compound are not particularly limited. The calcination can be carried out, for example, by using a calcining furnace such as an electric furnace, a kiln, a tube furnace or a pusher furnace in an atmosphere having an oxygen content of at least 20% by weight, such as oxygen atmosphere or dried air from which moisture and carbon dioxide are removed.

The above-mentioned mixture is calcined at a maximum temperature of 650 to 850° C., preferably at a temperature of 700 to 780° C.

When the mixture is calcined at a temperature lower than 650° C., in the case where the temperature exceeds 500° C., lithium nickel oxide is generated. However, since the crystal of the lithium nickel oxide is undeveloped and unstable in its structure, the structure of the lithium nickel oxide is easily destroyed by its phase transition and the like due to charging and discharging.

On the other hand, when the calcining temperature exceeds 850° C., since the layered structure of the lithium nickel oxide is collapsed, the insertion or elimination of lithium ions becomes difficult, and moreover, nickel oxide and the like are generated by the decomposition of the lithium nickel oxide.

It is particularly preferred that calcining is carried out in two steps in order to carry out a reaction homogeneously within a temperature range which is suitable for the growth of a crystal under the condition where water of crystallization of a lithium compound and the like are removed. More specifically, it is particularly preferred that the mixture is calcined at a temperature of 400 to 600° C. for one hour or more, and then at a temperature of 650 to 850° C. for 5 hours or more.

[(Process for Washing with Water (c)]

The process for washing with water (c) includes preparing a slurry of the calcined powder of lithium-nickel composite oxide obtained in the above process for preparing calcined powder (b) so as to have a slurry concentration of 500 to 2000 g/L, washing the calcined powder with water in the form of slurry for a period of time which satisfies the following formula (2):

$$B/40 < A \leq B/10 \qquad (2)$$

wherein A is a washing period of time of which unit is represented by minute, B is a concentration of a slurry, of which unit is represented by of g/L, and thereafter, filtering and drying the slurry.

(Concentration of Slurry)

In the process for washing with water (c), slurry is prepared by mixing water with the calcined powder of lithium-nickel composite oxide, and the calcined powder of lithium-nickel composite oxide is washed with water with stirring the slurry. At that time, the concentration of the slurry obtained by mixing water with the calcined powder of lithium-nickel composite oxide (slurry concentration) is controlled so as to be 500 to 2000 g/L, preferably 600 to 1800 g/L.

In accordance with the increase of the concentration of a slurry, the amount of the powder in the slurry increases. When the concentration of the slurry exceeds 2,000 g/L, the stirring of the slurry becomes difficult because the viscosity of the slurry increases. Moreover, since the concentration of alkali increases in the liquid of the slurry, the dissolution speed of deposits attached to the powder is lowered in accordance with their equilibrium, and even though the deposits are peeled off from the powder, it becomes difficult to separate the peeled deposits from the powder.

On the other hand, when the concentration of the slurry is less than 500 g/L, the amount of lithium eluted from the surface of each particle to the solution increases, because the concentration of the slurry is too low. Moreover, lithium comes to be eliminated from the crystal lattice of the lithium-nickel composite oxide. Thereby, the crystal of the lithium-nickel composite oxide comes to be easily collapsed, and moreover, there occurs a phenomenon such that the aqueous solution having a high pH value absorbs carbon dioxide existing in the air, to form lithium carbonate, and the resulting lithium carbonate deposits on the surface of the powder.

Accordingly, when washing with water is carried out, the concentration of the slurry is controlled to 500 to 2000 g/L.

(Electric Conductivity of the Liquid)

The electric conductivity of the liquid contained in the slurry during washing with water is not particularly limited. It is preferred that the electric conductivity of the liquid is controlled to 30 to 60 mS/cm, since impurities attached to the surface of the calcined powder can be easily removed from the surface.

When the electric conductivity of the liquid is out of the above-mentioned range (30 to 60 mS/cm), the above-mentioned over-washing problem occurs at the time of over-washing, or impurities attached to the surface of the above-mentioned calcined powder are not sufficiently removed from the surface, and the impurities remain on the surface in a large amount due to insufficient washing. For example, in accordance with the increase of the concentration of the slurry and the increase of the total amount of lithium eluted to the slurry, the electric conductivity of the slurry increases due to the increase of the concentration of the slurry. At that time, washing may become insufficient because the amount of lithium eluted from each particle decreases. In addition, in accordance with the decrease of the concentration of the slurry and the decrease of the total amount of lithium eluted to the slurry, the electric conductivity of the slurry decreases due to the decrease of the concentration of the slurry. At that time, over-washing may occur because the amount of lithium eluted from each particle increases.

Incidentally, the total eluted amount of lithium changes, and the electric conductivity changes, depending on the conditions other than the concentration of the slurry, such as calcining conditions and washing conditions such as stirring. Therefore, the calcining conditions and the washing conditions can be evaluated by determining the electric conductivity.

(Water for Forming Slurry)

The water used for forming slurry is not particularly limited. However, in order to prevent battery performance from lowering due to the adhesion of impurities to a positive electrode active material, the electrical conductivity of water is preferably less than 10 μS/cm, and more preferably 1 μS/cm or lower.

(Period of Time for Washing with Water)

The calcined powder of lithium-nickel composite oxide is washed with water for a period of time which satisfies the above-mentioned formula (2) in view of the concentration of slurry.

When the calcined powder of lithium-nickel composite oxide is formed by the above-method process, in the case where the period of time for washing with water is shorter than the time calculated by the above-mentioned formula (2), impurities and by-products adhering to the surface of the calcined powder cannot be sufficiently removed. When the powder is used in a positive electrode active material, there arises a problem such that the cycle characteristic of a secondary battery is lowered.

On the other hand, when the period of time for washing with water is longer than the period of time which is calculated by the above-mentioned formula (2), the aqueous solution having a high pH value absorbs carbon dioxide in the atmosphere, and the resulting lithium carbonate is precipitated on the surface of the powder. When the powder, to the surface of which lithium carbonate is attached in a large amount, is used as a positive electrode active material, there arises a problem such that a large amount of gas is generated when a secondary battery is heated to a high temperature.

Accordingly, it is preferred that the calcined powder of lithium-nickel composite oxide is washed with water within a period of time which satisfies the above-mentioned formula (2) in view of the concentration of slurry.

(Drying Temperature)

The drying temperature and drying method of the calcined powder of lithium-nickel composite oxide after washing with water are not particularly limited. The drying temperature is preferably 80 to 700° C., more preferably 100 to 550° C., and furthermore preferably 120 to 350° C.

The reason why the drying temperature is controlled to 80° C. or higher is that the calcined powder of lithium-nickel composite oxide after washing with water is dried promptly, to prevent the generation of a gradient of the concentration of lithium between the surface of the particle and the interior of the particle.

On the other hand, it is supposed that the calcined powder of lithium-nickel composite oxide after washing with water will be in an approximately stoicheiometric state, or be close to a charged state due to desorption of lithium in a little amount on or near the surface. Therefore, when the drying temperature of the calcined powder exceeds 700° C., there is a possibility such that electrical characteristic is lowered due to the distortion of the crystal structure of the powder being close to a charged state.

Accordingly, in order to eliminate anxiety concerning physical properties and characteristics of the calcined powder of the lithium-nickel composite oxide after washing with water, the drying temperature is desirably 100 to 550° C., and more desirably 120 to 350° C. in consideration of productivity and cost for thermal energy.

In addition, it is preferred that the calcined powder of lithium-nickel composite oxide after filtration is dried at a given temperature with a dryer which enables to control the atmosphere in the dryer to an atmosphere not containing a compound including carbon and sulfur or in a reduced-pressure atmosphere. In this case, since the moisture content of the lithium-nickel composite oxide can be sufficiently reduced, there is an advantage such that the generation of gas derived from the moisture can be inhibited when the lithium-nickel composite oxide is used as a positive electrode active material for the non-aqueous electrolyte secondary battery.

(Content of Moisture in the Powder after Drying)

The content of moisture in the calcined powder of lithium-nickel composite oxide after drying is not particularly limited, and is preferably 0.2% by weight or lower, more preferably 0.1% by weight or lower, because there is a possibility that a lithium compound is generated on the surface of the powder by absorbing gas containing carbon and sulfur in the atmosphere when the content of moisture in the powder exceeds 0.2% by weight.

Incidentally, the content of moisture is a value as determined by using a Karl Fischer moisture meter at a vaporization temperature of 300° C.

(The Others)

In the above-mentioned embodiments, as a process for obtaining a calcined powder of lithium-nickel composite oxide prior to washing with water, it has been described that a nickel compound which is prepared by dissolving or dispersing a metal element other than lithium by means of crystallization is mixed with a lithium compound as raw materials, and the resulting mixture is calcined. However, the process for obtaining a calcined powder of lithium-nickel composite oxide is not particularly limited. There can be cited, for example, a process for carrying out a spray-thermal decomposition of a solution prepared by mixing all of the aqueous solutions containing desired metal elements, and a process for pulverizing and mixing all of the compounds containing a desired metal element by means of a pulverizing mill such as a ball mill, and thereafter calcining the resulting mixture. From the viewpoint of the preparation of a lithium-nickel composite oxide having a small specific surface area after washing with water, it is preferred to use a lithium-nickel composite oxide which is produced by the above-mentioned process.

(Non-Aqueous Electrolyte Secondary Battery)

The non-aqueous electrolyte secondary battery of the present invention is produced by using a positive electrode which is produced by using a positive electrode active material including the above-mentioned lithium-nickel composite oxide, particularly a positive electrode active material including a lithium-nickel composite oxide which is produced by the above-mentioned process. Since the positive electrode is used in the non-aqueous electrolyte secondary battery of the present invention, the non-aqueous electrolyte secondary battery has a high capacity and high level of safety, and moreover is excellent in cycle characteristic.

The structure of the non-aqueous electrolyte secondary battery of the present invention is explained below.

The non-aqueous electrolyte secondary battery of the present invention (hereinafter simply referred to as secondary battery of the present invention) has substantially the same structure as standard non-aqueous electrolyte secondary batteries, except that the positive electrode active material for a non-aqueous electrolyte secondary battery of the present invention (hereinafter simply referred to as positive electrode active material of the present invention) is used as a material of a positive electrode.

More specifically, the secondary battery of the present invention has a case, and a positive electrode, a negative electrode, a non-aqueous electrolyte solution and a separator, which are accommodated in the case. Furthermore specifically, the secondary battery of the present invention is formed by laminating a positive electrode with a negative electrode through a separator to give an electrode body, immersing a non-aqueous electrolyte in the obtained electrode body, connecting a positive electrode current collector of a positive electrode and a negative electrode current collector of a negative electrode with a positive terminal for leading to outside and a negative terminal for leading to outside, respectively, through a lead for connecting an electrode with a terminal, accommodating them in a case, and sealing the case.

The structure of the secondary battery of the present invention is not limited only to the above-mentioned exemplified one, and various kinds of shapes such as an external form such as a cylindrical form or a laminated form can be employed.

(Positive Electrode)

The positive electrode which is one of the characteristics of the secondary battery of the present invention is firstly described.

The positive electrode is a sheet-like material. The positive electrode can be formed by, for example, coating a positive electrode mixture containing the positive electrode active material of the present invention on the surface of a current collector made of an aluminum foil, and drying the positive electrode mixture. The present invention is not particularly limited to the process for producing the positive electrode. The positive electrode also can be produced by supporting a positive electrode mixture containing particles of a positive electrode active material and a binder on a belt-like positive electrode core member (positive electrode current collector).

In addition, the positive electrode is appropriately treated so as to fit a battery to be used. For example, there can be conducted to the positive electrode a treatment such as a cutting treatment so as to have a suitable size corresponding to an objective battery, or a compressing treatment by means of a roll press or the like in order to increase an electrode density.

(Positive Electrode Mixture)

The positive electrode mixture can be prepared by mixing the positive electrode active material of the present invention in the form of powder with an electric conductive material and a binder, to give a positive electrode agent, adding a solvent to the positive electrode agent, and kneading the resulting mixture.

Hereinafter, materials other than the positive electrode active material, which are used in the positive electrode mixture, are described.

(Binder)

As a binder which is used in the positive electrode mixture, any of a thermoplastic resin and a thermosetting resin can be used. Among them, the thermoplastic resin is preferred. The present invention is not limited to the kind of the thermoplastic resin. The thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), a tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethylvinyl ether-tetrafluoroethylene copolymer, ethylene-acrylic acid copolymer, ethylene-methacrylic acid copolymer, ethylene-methyl acrylate copolymer, ethylene-methyl methacrylate copolymer, and the like. These resins can be used alone, or at least two kinds thereof can be used in combination. In addition, each of these resins can be a crosslinked resin being crosslinked by $Na^+$ ion and the like.

(Electric Conductive Material)

The electric conductive material used in the positive electrode mixture can be an electric conductive material which is chemically stable in a battery, and the present invention is not particularly limited to the kind of the electric conductive material. The electric conductive material includes, for example, graphite such as natural graphite (flake graphite and the like) and artificial graphite; carbon black such as acetylene black, ketjen black, channel black, furnace black, lamp black and thermal black; electric conductive fibers such as carbon fiber and metal fiber; metal powder such as aluminum powder; electric conductive whisker such as zinc oxide whisker and potassium titanate whisker; electric conductive metal oxide such as titanium oxide; organic electric conductive materials such as a polyphenylene derivative; fluorocarbon, and the like. These electric conductive materials can be used alone, or at least two kinds thereof can be used in combination.

The amount of the electric conductive material which is added to the positive electrode mixture is not particularly limited, and the amount is preferably 1 to 50% by weight, more preferably 1 to 30% by weight, and furthermore preferably 2 to 15% by weight to the powder of a positive-electrode active material contained in the positive electrode mixture.

(Solvent)

The solvent is used to dissolve a binder, and disperse a positive electrode active material, an electric conductive material and the like in the binder. The present invention is not limited to the kind of the solvent. The solvent includes, for example, an organic solvent such as N-methyl-2-pyrrolidone.

(Positive Electrode Core Material)

The positive electrode core material (positive electrode collector) can be an electronic conductor which is chemically stable in a battery, and is not particularly limited in the present invention. The positive electrode core material includes, for example, a foil or a sheet made of a material such as aluminum, stainless steel, nickel, titanium, carbon or an electric conductive resin. Among the positive electrode core materials, an aluminum foil and an aluminum alloy foil are preferred. Incidentally, a carbon layer or a titanium layer can be formed on the surface of a foil or a sheet. Alternatively, an oxide layer can be formed on the surface of a foil or a sheet. Also, a convex and concave form can be formed on the surface of a foil or a sheet. Furthermore, a net, a punching sheet, a lath, a porous material, a foamed material, a fibrous molded article or the like can be provided on the surface of a foil or a sheet.

The present invention is not limited to the thickness of the positive electrode core material. The thickness of the positive electrode core material is preferably, for example, 1 to 500 μm.

(Materials Other than Positive Electrode)

Next, the materials other than a positive electrode, which are used in the non-aqueous electrolyte secondary battery of the present invention, are described.

Incidentally, the characteristic of the non-aqueous electrolyte secondary battery of the present invention resides in that the above-mentioned positive electrode active material is used. The materials other than the positive electrode active material can be suitably selected, and the present invention is not limited to the materials other than the positive electrode active material as described later.

(Negative Electrode)

The negative electrode can be one which enables to charge or discharge lithium, and the present invention is not particularly limited to the kind of the negative electrode. As the negative electrode, there can be used a negative electrode in which a negative electrode mixture containing a negative electrode active material and a binder, and an electric conductive material and a thickener as optional components, is supported on a negative electrode core material. The negative electrode can be produced in the same manner as in the positive electrode.

The negative electrode active material can be one which enables to electrochemically charge or discharge lithium. The negative electrode active material includes, for example, graphite, hardly graphitizable carbon, lithium alloy, and the like. The lithium alloy is not particularly limited, and it is preferred that the lithium alloy contains at least one element selected from the group consisting of silicon, tin, aluminum, zinc and magnesium.

The average particle diameter of the negative electrode active material is not particularly limited, and is preferably, for example, 1 to 30 μm.

(Binder)

The binder which is used in the negative electrode mixture can be any of a thermoplastic resin and a thermosetting resin. Among the resins, the thermoplastic resin is preferred. The present invention is not particularly limited to the kind of the thermoplastic resin. The thermoplastic resin includes, for example, polyethylene, polypropylene, polytetrafluoroethylene (PTFE), polyvinylidene fluoride (PVDF), styrene-butadiene rubber, tetrafluoroethylene-hexafluoropropylene copolymer (FEP), a tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, vinylidene fluoride-perfluoromethyl vinyl ether-tetrafluoroethylene copolymer, ethylene-acrylate copolymer, ethylene-methacrylic acid copolymer, ethylene-methyl acrylate copolymer, ethylene-methyl methacrylate copolymer, and the like. These resins can be used alone, or at least two kinds thereof can be used in combination. In addition, each of these resins can be a crosslinked resin being crosslinked by $Na^+$ ion and the like.

(Electric Conductive Material)

The electric conductive material of a negative electrode mixture can be an electric conductive material which is chemically stable in a battery, and the present invention is not particularly limited to the kind of the electric conductive material. The electric conductive material includes, for example, graphite such as natural graphite (flake graphite and the like) and artificial graphite; carbon black such as acetylene black, ketjen black, channel black, furnace black, lamp black and thermal black; electric conductive fibers such as a carbon fiber and a metal fiber; metal powder such as copper powder and nickel powder; organic electric conductive materials such as a polyphenylene derivative, and the like. These electric conductive materials can be used alone, or at least two kinds thereof can be used in combination.

The amount of the electric conductive material to be added is not particularly limited. The amount of the electric conductive material is preferably 1 to 30% by weight, and more preferably 1 to 10% by weight to the particles of a negative electrode active material contained in the negative electrode material mixture.

(Negative Electrode Core Material)

The negative electrode core material (negative electrode collector) can be an electronic conductor which is chemically stable in a battery, and is not particularly limited in the present invention. The negative electrode core material includes, for example, a foil or a sheet made of a material such as stainless steel, nickel, copper, titanium, carbon or an electric conductive resin. Among the negative electrode core materials, copper and copper alloy are preferred. A layer such as a carbon layer, a titanium layer or a nickel layer can be formed on the surface of a foil or a sheet. Alternatively, an oxide layer can be formed on the surface of a foil or a sheet. Also, a convex and concave form can be formed on the surface of a foil or a sheet. Furthermore, a net, a punching sheet, a lath, a porous material, a foamed material, a fibrous molded article or the like can be provided on the surface of a foil or a sheet.

The present invention is not limited to the thickness of the negative electrode core material. The thickness of the negative electrode core material is preferably, for example, 1 to 500 μm.

(Non-Aqueous Electrolyte)

It is preferred that the non-aqueous electrolyte is a solution of a non-aqueous solvent in which a lithium salt is dissolved. The present invention is not particularly limited to the kind of the non-aqueous electrolyte. The non-aqueous electrolyte includes, for example, cyclic carbonates such as ethylene carbonate (EC), propylene carbonate (PC), butylene carbonate (BC) and vinylene carbonate (VC); chain carbonates such as dimethyl carbonate (DMC), diethyl carbonate (DEC), ethylmethyl carbonate (EMC) and dipropyl carbonate (DPC); aliphatic carboxylates such as methyl formate, methyl acetate, methyl propionate and ethyl propionate; lactones such as gamma-butyrolactone and gamma-valerolactone; chain ethers such as 1,2-dimethoxyethane (DME), 1,2-diethoxyethane (DEE) and ethoxymethoxy ethane (EME), cyclic ethers such as tetrahydrofuran and 2-methyltetrahydrofuran; dimethyl sulfoxide, 1,3-dioxolane, formamide, acetamide, dimethylformamide, dioxolane, acetonitrile, propyl nitrile, nitromethane, ethyl monoglyme, phosphoric acid triester, trimethoxymethane, dioxolane derivatives, sulfolane, methyl sulfolane, 1,3-dimethyl-2-imidazolidinone, 3-methyl-2-oxazolidinone, propylene carbonate derivatives, tetrahydrofuran derivatives, ethyl ethers, 1,3-propanesultone, anisole, dimethyl sulfoxide, N-methyl-2-pyrrolidone, and the like. These compounds can be used alone, or at least two kinds thereof can be used in combination.

Among the non-aqueous electrolytes, a mixed solvent of a cyclic carbonate and a chain carbonate, and a mixed solvent of a cyclic carbonate, a chain carbonate and an aliphatic carboxylate are particularly preferred.

(Lithium Salt)

The lithium salt which dissolves in a non-aqueous electrolyte includes, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroborane lithium, lithium tetraphenylborate, lithium imide, and the like. These lithium salts can be used alone, or at least two kinds thereof can be used in combination. Incidentally, it is preferred that at least $LiPF_6$ is used as the lithium salt.

The concentration of lithium salt in the non-aqueous solvent is not particularly limited, and is preferably 0.2 to 2 mol/L, and more preferably 0.5 to 1.5 mol/L.

(Other Additives)

To the non-aqueous electrolyte solution, various additives other than the lithium salt can be added in order to improve charge-discharge characteristic of a battery. The present invention is not particularly limited to the kind of the additives. The additives include, for example, triethyl phosphite, triethanolamine, cyclic ethers, ethylenediamine, n-glyme, pyridine, hexaphosphoric acid triamide, nitrobenzene derivatives, crown ethers, quaternary ammonium salts, ethylene glycol dialkyl ethers, and the like.

(Separator)

A fine separator is intervened between a positive electrode and a negative electrode. This separator is not particularly limited, and it is preferred that the separator is a microporous thin film having a high ion permeability, a predetermined mechanical strength and high electric insulation. In particular, it is preferred that the microporous thin film has some properties such that holes of the thin film are closed at a predetermined temperature, and that the thin film has a function for increasing a resistance.

The material used in the microporous thin film is not particularly limited. As the material used in the microporous thin film, for example, polyolefin such as polypropylene and polyethylene can be used, because the polyolefin is excellent in organic solvent resistance and hydrophobicity. Also, as the material used in the microporous thin film, a sheet made of glass fibers or the like, non-woven fabrics and woven fabrics can be used.

When the microporous thin film is used as a separator, the pore diameter existing in the thin film is not particularly limited. It is preferred that the pore diameter is, for example, 0.01 to 1 μm. Also, the porosity of the separator is not particularly limited. It is preferred that the porosity is generally 30 to 80%. Furthermore, the thickness of the separator is not also particularly limited. It is preferred that the thickness is generally 10 to 300 μm.

Furthermore, the separators used in the positive electrode and the negative electrode can be different from each other. The polymer electrolyte which includes a non-aqueous electrolyte and a polymer substrate for retaining the non-aqueous electrolyte can be used as a separator by unifying into one body with a positive electrode or a negative electrode. The polymer substrate is not particularly limited, provided that the polymer substrate can retain a non-aqueous electrolyte. It is preferred that the polymer used in the polymer substrate is a copolymer of vinylidene fluoride and hexafluoropropylene.

EXAMPLES

The present invention will be more specifically described by the following working examples of the present invention and comparative examples, but the present invention is not limited only to the working examples.

In the working examples and comparative examples, in accordance with the following methods, metals included in lithium-nickel composite oxide were analyzed, and moisture content and specific surface area of the lithium-nickel composite oxide were examined.

(1) Analysis of metals: determined by ICP emission spectrometry.

(2) Measurement of moisture content: determined by using a Karl Fischer moisture meter manufactured by KYOTO ELECTRONICS MANUFACTURING CO., LTD. under the item number of MKC210 at a temperature of 300° C.

(3) Measurement of specific surface area: determined by a BET method with a specific surface area measuring apparatus commercially available from Yuasa Ionics Inc. under the trade name of Multisorb 16.

(Method for Producing Secondary Battery for Evaluating Battery Performance)

When battery performance of a non-aqueous electrolyte secondary battery, in which the lithium-nickel composite oxide of the present invention was used as a positive electrode active material, was evaluated, a 2032 coin type battery as shown in FIG. 1 (hereinafter referred to as coin type battery 1) was used.

As shown in FIG. 1, the coin type battery 1 is composed of a case 2 and an electrode 3 which is accommodated in the case 2.

The case 2 has a positive electrode can 2a which is hollow and has an opening at one end, and a negative electrode can 2b which is arranged at the opening of the positive electrode can 2a. When the negative electrode can 2b is placed on the opening of the positive electrode can 2a, a space for accommodating an electrode 3 is formed between the negative electrode can 2b and the positive electrode can 2a.

The electrode 3 includes a positive electrode (electrode for evaluation) 3a, a separator 3c and a negative electrode (lithium metal negative electrode) 3b, and these constituents are arranged in this order. The positive electrode 3a and the negative electrode 3b are accommodated in the case 2 so that the positive electrode 3a is contacted with the inner surface of the positive electrode can 2a, and that the negative electrode 3b is contacted with the inner surface of the negative electrode can 2b.

In addition, the case 2 is equipped with a gasket 2c. The positive electrode can 2a and the negative electrode 2b are maintained so that the positive electrode can 2a is not contacted with the negative electrode 2b through the gasket 2c, and the positive electrode can 2a and the negative electrode 2b are fixed by the gasket 2c. Also, since the gasket 2c seals the space between the positive electrode can 2a and the negative electrode 2b, the gasket 2c has a function for airtightly and liquid-tightly blocking the space between the inside of the case 2 and its outside.

The above-mentioned coin type battery 1 was produced by the following methods.

At first, 5 parts by weight of acetylene black and 5 parts by weight of polyvinylidene fluoride were mixed with 90 parts by weight of powder of a positive electrode active material, and n-methyl pyrrolidone is added to the resulting mixture, to give a paste. An aluminum foil having a thickness of 20 μm was coated with the paste, so that the amount of the positive electrode active material after drying was 0.05 g/cm$^2$.

Thereafter, the aluminum foil which was coated with the paste was dried at 120° C. under reduced pressure, and then the aluminum foil was punched into a disc having a diameter of 1 cm, to give a positive electrode 3a.

A coin type battery 1 was produced by using the positive electrode 3a, the negative electrode 3b, the separator 3c and an electrolyte solution in a glove box having argon gas atmosphere of which dew point was controlled to −80° C.

Incidentally, as the negative electrode 3b, a discoidal plate made of lithium metal having a diameter of 15 mm was used.

As the separator 3c, a porous polyethylene film having a thickness of 20 μm was used.

As the electrolyte solution, a mixed solution of ethylene carbonate (EC) and diethyl carbonate (DEC) being mixed in an equal ratio, containing 1 M of LiClO$_4$ as a supporting electrolyte (manufactured by Ube Industries, Ltd.) was used.

The battery characteristics of the coin type battery produced by the above-mentioned method were evaluated. As the battery characteristics, initial electric discharge capacity, positive electrode reaction resistance, retention of capacity after 500 cycles and DSC calorific value were determined.

The initial discharge capacity was determined by the following method.

At first, a coin type battery 1 was produced, and then the coin type battery 1 was allowed to stand for about 24 hours. After the open circuit voltage OCV (Open Circuit Voltage) of the coin type battery 1 was stabilized, the positive electrode of the coin type battery 1 was charged with a cutoff voltage of 4.3 V at a current density of 0.1 mA/cm$^2$. After 1 hour paused, the coin type battery 1 was discharged to a cutoff voltage of 3.0 V. When the coin type battery 1 was discharged to a cutoff voltage of 3.0 V, the capacity of the coin type battery 1 was regarded as an initial discharge capacity.

The positive electrode reaction resistance was calculated by the following method.

First of all, the coin type battery was charged to a charging voltage of 4.1 V. The positive electrode reaction resistance of the coin type battery was determined by an AC impedance method with a frequency response analyzer and a potentiogalvanostat (manufactured by Solartron ISA under the item number of 1255B). As a result, a Nyquist plot was obtained as shown in FIG. 2. The Nyquist plot shows a sum of characteristic curves indicating a solution resistance, a negative electrode resistance and its capacity, and a positive electrode resistance and its capacity. Therefore, a fitting calculation was carried out by using an equivalent circuit based on the Nyquist plot, to obtain a value of the positive electrode reaction resistance.

The retention of capacity after 500 cycles was determined by continuously carrying out the above-mentioned measurement of the charge and discharge capacity after 500 cycles, and a final discharge capacity was measured. The ratio of the final discharge capacity to the initial discharge capacity was regarded as retention of capacity after 500 cycles.

When evaluating thermal safety, exothermic behavior of the positive electrode of the initially charged coin type battery was examined by using an apparatus for determining DSC (differential scanning calorimeter), and the total amount of calorific value (DSC calorific value) was evaluated. In accordance with the lowering of the DSC calorific value, thermal stability of the positive electrode active material becomes more excellent, that is, safety of the coin type battery increases.

More specifically, the coin type battery was allowed to stand for about 24 hours so that the OCV was stabilized, as well as the measurement of the initial discharge capacity. The constant current-constant voltage charge (CCCV charge), which included charging to the voltage of 4.3 V at an electric current density of 0.5 mA/cm$^2$ on the positive electrode, and terminating the charging when the electric current attained to 0.01 mA or less at a constant voltage, was carried out.

Thereafter, the charged coin type battery was disassembled, and the positive electrode was taken out from the battery. The electrolyte solution attached to the positive electrode was removed from the positive electrode as much as possible until the amount of the electrolyte attached to the positive electrode became not more than 0.05 mg.

Next, 3 mg of the positive electrode and 1.3 mg of the electrolyte solution which was used in the coin type battery were put into an aluminum pan for determining DSC, and the pan was sealed by swaging. Thereafter, a micro vent for degassing was formed on the surface of the aluminum pan, to give a sample for examining properties.

On the other hand, 3 mg of alumina powder was put into an aluminum pan for determining DSC, and a reference electrode was formed in the same manner as in the sample for examining properties.

The above-mentioned sample for examining properties and the above-mentioned reference electrode were scanned with a differential scanning calorimeter at a rising rate of 10° C./min within a temperature range of from room temperature to 305° C., to examine their exothermic behaviors. Incidentally, as the differential scanning calorimeter, a differential scanning calorimeter commercially available from Rigaku Corporation under the item number of DSC-10A was used.

Example 1

The process according to the present invention, that is, a series of processes including a process for preparing nickel oxide containing predetermined components, a process for preparing a calcined powder containing predetermined components and a process for washing the resulting calcined powder with water and thereafter drying the calcined powder was carried out, to give lithium-nickel composite oxide in which each metal component contained in the lithium-nickel composite oxide was controlled so as to have a predetermined molar ratio.

The specific surface area of the obtained lithium-nickel composite oxide was determined.

In addition, a positive electrode material was produced by using the obtained lithium-nickel composite oxide as a positive electrode active material, and a coin type battery was assembled by using the positive electrode material in the same manner as described above.

Incidentally, each material which was used for producing lithium-nickel composite oxide was weighed so that the molar ratio of each metal satisfied the equation of Ni:Co:Al:Li=0.82:0.15:0.03:1.03 in the calcined lithium-nickel composite oxide.

(1) Process for Preparing Nickel Oxide

First of all, nickel sulfate hexahydrate (manufactured by Wako Pure Chemical Industries, Ltd.), cobalt sulfate heptahydrate (manufactured by Wako Pure Chemical Industries, Ltd.) and aluminum sulfate (manufactured by Wako Pure Chemical) were mixed together in a predetermined ratio, and the resulting mixture was dissolved in water, to give an aqueous solution. The aqueous solution, aqueous ammonium solution (manufactured by Wako Pure Chemical) and aqueous sodium hydroxide solution (manufactured by Wako Pure Chemical) were added dropwise simultaneously to a reaction vessel equipped with a discharge opening and a stirrer, in which water being maintained to 50° C. was poured, to give spherical nickel hydroxide which was formed by the agglomeration of primary particles in accordance with a reactive crystallization method. At that time, the pH of the liquid in the reaction vessel was controlled to 11.5, and the period of time for retaining the particles in the reaction vessel was controlled to 11 hours.

Thereafter, the nickel hydroxide obtained by the reactive crystallization method was calcined at a calcining temperature of 700° C., to give nickel oxide.

(2) Process for Preparing Calcined Powder

The nickel oxide obtained in the above was mixed with lithium hydroxide monohydrate (manufactured by Wako Pure Chemical Industries, Ltd.) so as to have a desired composition. The resulting mixture was calcined at 600° C. for 3 hours in an atmosphere having an oxygen content of 30% or more in an electric furnace, and then sintered at 765° C. for 8 hours or more. Thereafter, the sintered product was cooled to room temperature in the electric furnace, and then pulverized, to give spherical calcined powder which was formed by the aggregation of primary particles. The composition of the spherical calcined powder was analyzed.

(3) Process for Washing the Calcined Powder with Water in the Form of Slurry and Thereafter Drying the Powder.

To the calcined powder obtained in the above, pure water was added, to give a slurry having a concentration of 750 g/L. The slurry was stirred for 30 minutes, and the calcined powder was washed with water in the form of slurry. The slurry was filtered to give a powder. The powder was allowed to stand for 10 hours in a vacuum dryer which was heated to 180° C. Thereafter, the specific surface area of the powder of lithium-nickel composite oxide obtained by washing the calcined powder with water in the form of slurry and drying the slurry, that is, powder of lithium-nickel composite oxide obtained as a final product was determined. Its results are shown in Table 1. In addition, the moisture content of the powder was determined. As a result, the moisture content was 0.07% by weight. In addition, the lithium ratio of the powder of lithium-nickel composite oxide obtained as a final product was 0.99.

A coin type battery was produced in accordance with the above-mentioned method by using the powder of lithium-nickel composite oxide obtained as a final product. The initial discharge capacity, positive electrode reaction resistance, retention of capacity after 500 cycles and DSC calorific value of the coin type battery obtained in the above were determined. Their results are shown in Table 1, respectively.

Example 2

The same procedures as in Example 1 were carried out except that the concentration of the slurry was changed to 500 g/L, and the slurry was stirred for 20 minutes in the process for washing the calcined powder with water in the form of slurry, to give lithium-nickel composite oxide. The composition and specific surface area of the obtained powder were determined. Also, initial discharge capacity, positive electrode reaction resistance, cycle retention ratio and DSC calorific value of a coin type battery produced by using this powder were determined. The results are shown in Table 1, respectively.

Example 3

The same procedures as in Example 1 were carried out except that the concentration of the slurry was changed to 1500 g/L, and the slurry was stirred for 60 minutes in the process for washing the calcined powder with water in the form of slurry, to give lithium-nickel composite oxide. The composition and specific surface area of the obtained powder were determined. Also, initial discharge capacity, positive electrode reaction resistance, cycle retention ratio and DSC calorific value of a coin type battery produced by using this powder were determined. The results are shown in Table 1, respectively.

Example 4

The same procedures as in Example 1 were carried out except that the concentration of the slurry was changed to 2000 g/L, and the slurry was stirred for 80 minutes in the process for washing the calcined powder with water in the form of slurry, to give lithium-nickel composite oxide. The composition and specific surface area of the obtained powder were determined. Also, initial discharge capacity, positive electrode reaction resistance, cycle retention ratio and DSC calorific value of a coin type battery produced by using this powder were determined. The results are shown in Table 1, respectively.

Example 5

In the process for preparing lithium-nickel composite oxide, the same procedures as in Example 1 were carried out, except that nickel sulfate hexahydrate (manufactured by Wako Pure Chemical Industries, Ltd.), cobalt sulfate heptahydrate (manufactured by Wako Pure Chemical Industries, Ltd.), aluminum sulfate (manufactured by Wako Pure Chemical Industries, Ltd.) and manganese sulfate pentahydrate (manufactured by Wako Pure Chemical Industries, Ltd.) were mixed together so that the molar ratio of each metal component after calcining the lithium-nickel composite oxide satisfied the equation of Ni:Co:Al:Li=0.82:0.15:0.03:1.05, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively. Incidentally, the lithium ratio of the powder of lithium-nickel composite oxide obtained as a final product was 1.02.

Example 6

In the process for preparing lithium-nickel composite oxide, the same procedures as in Example 1 were carried out except that nickel sulfate hexahydrate (manufactured by Wako Pure Chemical Industries, Ltd.), cobalt sulfate heptahydrate (manufactured by Wako Pure Chemical Industries, Ltd.), aluminum sulfate (manufactured by Wako Pure Chemical Industries, Ltd.) and manganese sulfate pentahydrate (manufactured by Wako Pure Chemical Industries, Ltd.) were mixed together so that the molar ratio of each metal component after calcining the lithium-nickel composite oxide satisfied the equation of Ni:Co:Al:Li=0.82:0.15:0.03:1.08, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively. Incidentally, the lithium ratio of the powder of lithium-nickel composite oxide obtained as a final product was 1.04.

Example 7

The same procedures as in Example 1 were carried out except that the calcining temperature was changed to 650° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Example 8

The same procedures as in Example 1 were carried out except that the calcining temperature was changed to 700° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Example 9

The same procedures as in Example 1 were carried out except that the calcining temperature was changed to 800° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Example 10

The same procedures as in Example 1 were carried out except that the calcining temperature was changed to 850° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 1

The same procedures as in Example 1 were carried out except that the concentration of the slurry was changed to 400 g/L, and the slurry was stirred for 10 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 2

The same procedures as in Example 1 were carried out except that the concentration of the slurry was changed to 750 g/L, and the slurry was stirred for 15 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 3

The same procedures as in Example 1 were carried out except that the concentration of the slurry was changed to 2250 g/L, and the slurry was stirred for 50 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 4

The same procedures as in Example 1 were carried out except that the concentration of the slurry was changed to 400 g/L, and the slurry was stirred for 50 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 5

The same procedures as in Example 1 were carried out except that the concentration of the slurry was changed to 750 g/L, and the slurry was stirred for 80 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 6

The same procedures as in Example 1 were carried out except that the concentration of the slurry was changed to 2250 g/L, and the slurry was stirred for 210 minutes in the process for washing the calcined powder with water in the form of slurry, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 7

In the process for preparing lithium-nickel composite oxide, the same procedures as in Example 1 were carried out except that nickel sulfate hexahydrate (manufactured by Wako Pure Chemical Industries, Ltd.), cobalt sulfate heptahydrate (manufactured by Wako Pure Chemical Industries, Ltd.), aluminum sulfate (manufactured by Wako Pure Chemical Industries, Ltd.) and manganese sulfate pentahydrate (manufactured by Wako Pure Chemical Industries, Ltd.) were mixed together so that the molar ratio of each metal component after calcining the lithium-nickel composite oxide satisfied the equation of Ni:Co:Al:Li=0.82:0.15:0.03:0.98, to give lithium-nickel composite oxide was prepared. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively. Incidentally, the lithium ratio of the powder of lithium-nickel composite oxide obtained as a final product was 0.95.

Comparative Example 8

In the process for preparing lithium-nickel composite oxide, the same procedures as in Example 1 were carried out except that nickel sulfate hexahydrate (manufactured by Wako Pure Chemical Industries, Ltd.), cobalt sulfate heptahydrate (manufactured by Wako Pure Chemical Industries, Ltd.), aluminum sulfate (manufactured by Wako Pure Chemical Industries, Ltd.) and manganese sulfate pentahydrate (manufactured by Wako Pure Chemical Industries, Ltd.) were mixed so that the molar ratio of each metal component after calcining the lithium-nickel composite oxide satisfied the equation of Ni:Co:Al:Li=0.82:0.15:0.03:1.13, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively. Incidentally, the lithium ratio of the powder of lithium-nickel composite oxide obtained as a final product was 1.09.

Comparative Example 9

The same procedures as in Example 1 were carried out except that the calcining temperature was changed to 600° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

Comparative Example 10

The same procedures as in Example 1 were carried out except that the calcining temperature was changed to 900° C. in the process for preparing a calcined powder, to give lithium-nickel composite oxide. The composition and specific surface area of the obtained powder were determined. Also, the initial discharge capacity, positive electrode reaction resistance, cycle retention ratio and DSC calorific value of a coin type battery produced by using this powder were determined. The results are shown in Table 1, respectively.

(Evaluation)

The results of evaluation are shown in Table 1.

As shown in Table 1, according to Examples 1 to 10, lithium-nickel composite oxides were prepared in accordance with the conditions in the process for producing of the present invention. The specific surface area (specific surface area after washing with water) of the powder obtained in each Example was within a range of 1.0 to 2.0 $m^2/g$.

A coin type battery was produced by using the lithium-nickel composite oxides as a positive electrode active material. As a result, it was confirmed that the coin type battery had high initial discharge capacity, an appropriate value of positive electrode reaction resistance and high retention of capacity after 500 cycles (cycle retention ratio).

In addition, each coin type battery obtained in Examples 1 to 3 and Examples 5 to 10 showed initial discharge capacity exceeding 195 mAh/g. Also, the initial discharge capacity did not change greatly depending on the specific surface area of the lithium-nickel composite oxide which was used as a positive electrode active material, and was stable at high capacity.

Moreover, each coin type battery obtained in Examples 1, 3 and 5 to 10 was stable in positive reaction resistance and DSC calorific value, and showed a cycle retention ratio of 90% or more. In contrast, as to the coin type battery obtained in Examples 2, the value of reaction resistance was increased, and as to the coin type battery obtained in Examples 4, the initial discharge capacity was lowered. It is considered that this phenomenon is caused by a factor such that the electric conductivity of the slurry after washing with water was without the range of 30 to 60 mS/cm.

Each of the coin type batteries obtained in Comparative examples 1 to 3 was lowered in initial discharge capacity, and increased in DSC calorific value. These phenomena were caused by insufficient washing of lithium-nickel composite oxide obtained in Comparative examples 1 to 3, From the results as mentioned above, when a positive electrode active material (lithium-nickel composite oxide) is prepared in accordance with the process of the present invention, and a non-aqueous electrolyte secondary battery is produced by using the positive electrode active material, it can be understood that there can be obtained a battery which has excellent battery characteristics such as high initial discharge capacity, excellent cycle characteristic and low positive electrode reaction resistance.

TABLE 1

|  | Concentration of Slurry when washing with water (g/L) | Washing period of time with water (min) | Molar ratio of Li in Li—Ni Composite oxide | Calcination Temp. (° C.) | Specific surface Area ($m^2/g$) | Electric conductivity of slurry after washing with water (mS/cm) | Coin type battery ||||
|---|---|---|---|---|---|---|---|---|---|---|
|  |  |  |  |  |  |  | Initial discharge capacity (mAh/g) | Positive electrode reaction resistance (Relative value) | Retention of capacity after 500 cycles (%) | DSC calorific value (Relative value) |
| Example 1 | 750 | 30 | 1.03 | 765 | 1.5 | 40 | 200 | 100 | 96 | 100 |
| Example 2 | 500 | 20 | 1.03 | 765 | 1.6 | 28 | 196 | 120 | 92 | 95 |
| Example 3 | 1500 | 60 | 1.03 | 765 | 1.5 | 52 | 199 | 102 | 94 | 98 |
| Example 4 | 2000 | 80 | 1.03 | 765 | 1.4 | 63 | 194 | 102 | 94 | 109 |
| Example 5 | 750 | 30 | 1.06 | 765 | 1.4 | 45 | 204 | 94 | 93 | 104 |
| Example 6 | 750 | 30 | 1.08 | 765 | 1.2 | 50 | 208 | 91 | 91 | 109 |
| Example 7 | 750 | 30 | 1.03 | 650 | 1.9 | 48 | 196 | 106 | 93 | 95 |
| Example 8 | 750 | 30 | 1.03 | 700 | 1.7 | 43 | 198 | 104 | 92 | 98 |
| Example 9 | 750 | 30 | 1.03 | 800 | 1.4 | 39 | 197 | 104 | 93 | 97 |
| Example 10 | 750 | 30 | 1.03 | 850 | 1.1 | 38 | 195 | 106 | 94 | 94 |
| Comp. Ex. 1 | 400 | 10 | 1.03 | 765 | 0.9 | 28 | 192 | 94 | 87 | 112 |
| Comp. Ex. 2 | 750 | 15 | 1.03 | 765 | 0.8 | 38 | 193 | 91 | 89 | 116 |
| Camp. Ex. 3 | 2250 | 50 | 1.03 | 765 | 0.7 | 68 | 190 | 86 | 88 | 115 |
| Comp. Ex. 4 | 400 | 50 | 1.03 | 765 | 2.6 | 40 | 190 | 126 | 93 | 80 |
| Comp. Ex. 5 | 750 | 80 | 1.03 | 765 | 2.3 | 49 | 192 | 126 | 92 | 82 |
| Comp. Ex. 6 | 2250 | 210 | 1.03 | 765 | 2.2 | 73 | 189 | 125 | 94 | 85 |
| Comp. Ex. 7 | 750 | 30 | 0.98 | 765 | 2.1 | 26 | 190 | 129 | 85 | 84 |
| Comp. Ex. 8 | 750 | 30 | 1.03 | 765 | 0.9 | 67 | 208 | 80 | 84 | 118 |
| Comp. Ex. 9 | 750 | 30 | 1.03 | 600 | 0.8 | 80 | 178 | — | — | — |
| Comp. Ex. 10 | 750 | 30 | 1.03 | 900 | 3.4 | 37 | 174 | — | — | — | because the period of time for washing the lithium-nickel composite oxide with water was relatively too short.

Also, each of the coin type batteries obtained in Comparative examples 4 to 6 was increased in positive electrode reaction resistance, and lowered in cycle retention ratio. These phenomena were caused by excess washing of the lithium-nickel composite oxide obtained in Comparative examples 4 to 6, because the period of time for washing the lithium-nickel composite oxide with water was too long.

Moreover, the coin type batteries obtained in Comparative example 7 was lowered in initial discharge capacity, and increased in positive electrode reaction resistance, because the ratio of Li in the lithium-nickel composite oxide was small.

The coin type battery obtained in Comparative example 8 was increased in DSC calorific value in accordance with the increase of initial discharge capacity. However, the initial discharge capacity was too large because the ratio of Li in the lithium-nickel composite oxide was too large. Moreover, the coin type battery obtained in Comparative example 8 was lowered in cycle retention ratio due to the excess lowering in positive electrode reaction resistance.

In Comparative examples 9 and 10, lithium-nickel composite oxide having a single phase could not be prepared, because the lithium-nickel composite oxide was prepared under the conditions that the lithium-nickel composite oxide could not be normally synthesized. Therefore, positive electrode reaction resistance and DSC calorific value could not be exactly determined by using the lithium-nickel composite oxide.

Incidentally, the positive electrode reaction resistance and the DSC calorific value shown in Table 1 are values relative to Example 1, respectively, when the value of positive electrode reaction resistance and the DSC calorific value in Example 1 are regarded as 100, respectively.

INDUSTRIAL APPLICABILITY

The non-aqueous electrolyte secondary battery of the present invention has high capacity and is excellent in safety. Therefore, the non-aqueous electrolyte secondary battery of the present invention can be particularly suitably used as a secondary battery capable of charging and discharging, which can be used in small portable electronic equipments such as a notebook personal computer and a mobile phone.

EXPLANATION OF REFERENTIAL NUMBERS

1 Coin type battery
2 Case
2a Positive electrode can
2b Negative electrode can
2c Gasket
3 Electrode
3a Positive electrode
3b Negative electrode
3c Separator

The invention claimed is:
1. A process for producing a positive electrode active material for a non-aqueous electrolyte secondary battery; comprising the following processes (a) to (c):

(a) a process for calcining at least one of nickel hydroxide and nickel oxyhydroxide, which contains nickel as a major component and at least one element selected from the group consisting of transition metal elements other than nickel, group II elements and group XIII elements as a subsidiary component in a nonreducing atmosphere having a temperature of 500° C. to 850° C., to prepare a nickel oxide;

(b) a process for preparing a calcined powder represented by the following formula (1):

$$Li_a Ni_{1-b} M_b O_2 \tag{1}$$

wherein M is at least one element selected from the group consisting of transition metal elements other than Ni, group II elements and group XIII elements, and a satisfies 1.00≤a≤1.10, and b satisfies 0.01≤b≤0.5, which comprises mixing the nickel oxide with a lithium compound so that the molar ratio of lithium included in the lithium compound to the total moles of nickel, transition metal elements other than nickel contained in the nickel oxide, group II elements and group XIII elements is 1.00 to 1.10, and thereafter calcining the resulting mixture in an oxygen-containing atmosphere at a temperature of 650 to 850° C.; and (c) a process for preparing powder of lithium-nickel composite oxide, which comprises preparing a slurry comprising the calcined powder in a concentration of 500 to 2000 g/L, washing the calcined powder with water in the form of slurry for a period of time which satisfies the following formula (2):

$$B/40 < A \leq B/10 \tag{2}$$

wherein A is a period of time for washing with water, of which unit is represented by minute, and B is a concentration of a slurry, of which unit is represented by g/L, and thereafter filtering and drying the slurry.

2. The process for producing a positive electrode active material for a non-aqueous electrolyte secondary battery according to claim 1, wherein the electric conductivity of liquid part of the slurry is controlled to 30 to 60 mS/cm.

3. The process for producing a positive electrode active material according to claim 1, wherein the nickel hydroxide is prepared by adding dropwise an aqueous solution of a metal compound containing nickel as a major component and at least one element selected from the group consisting of transition metals other than nickel, group II elements and group XIII elements as a subsidiary component, and an aqueous solution containing a compound for supplying ammonium ion to a reaction vessel being heated, and adding dropwise an aqueous solution of an alkali metal hydroxide to the reaction vessel in an amount which is sufficient for maintaining the resulting reaction solution to alkaline.

4. The process for producing a positive electrode active material according to claim 1, wherein the nickel oxyhydroxide is prepared by adding dropwise an aqueous solution of a metal compound containing nickel as a major component and at least one element selected from the group consisting of transition metals other than nickel, group II elements and group XIII elements as a subsidiary component, and an aqueous solution containing a compound for supplying ammonium ion to a reaction vessel being heated, adding dropwise an aqueous solution of an alkali metal hydroxide to the reap vessel in an amount which is sufficient for maintaining the resulting reaction solution to alkaline, and subsequently further adding an oxidizing agent to the reaction vessel.

5. The process for producing a positive electrode active material for a non-aqueous electrolyte secondary battery according to claim 1, wherein the lithium compound is at least one member selected from the group consisting of lithium hydroxide, lithium oxyhydroxide, lithium oxide, lithium carbonate, lithium nitrate and lithium halide.

6. The process for producing a positive electrode active material for a non-aqueous electrolyte secondary battery according to claim 1, wherein drying is carried out in an atmosphere not containing a compound including carbon and sulfur or in a reduced-pressure atmosphere in the process (c).

* * * * *